(12) United States Patent
Sundara-Rajan et al.

(10) Patent No.: US 10,976,840 B2
(45) Date of Patent: *Apr. 13, 2021

(54) MULTI-ELECTRODE ACTIVE STYLUS TIP

(71) Applicant: Wacom Co., Ltd., Saitama (JP)

(72) Inventors: Kishore Sundara-Rajan, San Jose, CA (US); Shahrooz Shahparnia, Campbell, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,060

(22) Filed: Nov. 25, 2019

(65) Prior Publication Data
US 2020/0089344 A1 Mar. 19, 2020

Related U.S. Application Data

(63) Continuation of application No. 16/135,749, filed on Sep. 19, 2018, now Pat. No. 10,488,952, which is a continuation of application No. 13/332,919, filed on Dec. 21, 2011, now Pat. No. 10,082,889.

(60) Provisional application No. 61/553,114, filed on Oct. 28, 2011.

(51) Int. Cl.
*G06F 3/0354* (2013.01)

(52) U.S. Cl.
CPC .................. *G06F 3/03545* (2013.01)

(58) Field of Classification Search
CPC .................................. G06F 3/03545
See application file for complete search history.

(56) References Cited

U.S. PATENT DOCUMENTS

| | | | |
|---|---|---|---|
| 4,246,439 A | 1/1981 | Romein | |
| 4,695,680 A | 9/1987 | Kable | |
| 4,725,978 A | 2/1988 | Fujioka | |
| 5,007,085 A * | 4/1991 | Greanias | G06F 3/046 178/18.01 |
| 5,313,051 A | 5/1994 | Brigida et al. | |
| 5,696,538 A | 12/1997 | Kishi | |
| 5,973,677 A | 10/1999 | Gibbons | |
| 5,977,959 A | 11/1999 | Katsurahira et al. | |
| 6,188,392 B1 | 2/2001 | O'Connor et al. | |
| 6,324,920 B1 | 12/2001 | DeSchrijver | |
| 7,342,350 B2 | 3/2008 | Toda | |

(Continued)

FOREIGN PATENT DOCUMENTS

| | | |
|---|---|---|
| CN | 102103446 A | 6/2011 |
| WO | 2012/129247 A2 | 9/2012 |

OTHER PUBLICATIONS

Kyung, Ki-Uk et al., "wUbi-Pen : Windows Graphical User Interface Interacting with Haptic Feedback Stylus," *SIGGRAPH* Los Angeles, California, Aug. 2008.

(Continued)

*Primary Examiner* — Patrick N Edouard
*Assistant Examiner* — Joseph P Fox
(74) *Attorney, Agent, or Firm* — Seed IP Law Group LLP

(57) ABSTRACT

In one embodiment, a device includes a stylus tip capable of communicating wirelessly with another device through a touch sensor of the other device. The stylus tip includes one or more surface areas, one or more substrates disposed along one or more of the surface areas of the stylus tip, and a plurality of electrodes disposed on or in the one or more substrates.

20 Claims, 16 Drawing Sheets

(56) References Cited

U.S. PATENT DOCUMENTS

| | | |
|---|---|---|
| 7,612,767 B1 | 11/2009 | Griffin et al. |
| 7,663,607 B2 | 2/2010 | Hotelling et al. |
| 7,875,814 B2 | 1/2011 | Chen et al. |
| 7,920,129 B2 | 4/2011 | Hotelling et al. |
| 8,031,094 B2 | 10/2011 | Hotelling et al. |
| 8,031,174 B2 | 10/2011 | Hamblin et al. |
| 8,040,326 B2 | 10/2011 | Hotelling et al. |
| 8,049,732 B2 | 11/2011 | Hotelling et al. |
| 8,179,381 B2 | 5/2012 | Frey et al. |
| 8,378,967 B2 | 2/2013 | Noda et al. |
| 8,638,320 B2 * | 1/2014 | Harley ............... G06F 3/044 178/18.06 |
| 8,648,837 B1 | 2/2014 | Tran et al. |
| 2003/0067427 A1 | 4/2003 | Comiskey et al. |
| 2004/0189621 A1 * | 9/2004 | Cho ............... G06F 3/03545 345/179 |
| 2008/0238885 A1 | 10/2008 | Zachut et al. |
| 2009/0095540 A1 | 4/2009 | Zachut et al. |
| 2009/0115725 A1 | 5/2009 | Shemesh et al. |
| 2009/0127005 A1 | 5/2009 | Zachut et al. |
| 2009/0153152 A1 | 6/2009 | Maharyta et al. |
| 2009/0184939 A1 | 7/2009 | Wohlstadter et al. |
| 2009/0251434 A1 | 10/2009 | Rimon et al. |
| 2009/0315854 A1 | 12/2009 | Matsuo |
| 2010/0006350 A1 | 1/2010 | Elias |
| 2010/0090988 A1 | 4/2010 | Park |
| 2010/0155153 A1 | 6/2010 | Zachut |
| 2010/0292945 A1 | 11/2010 | Reynolds et al. |
| 2010/0315384 A1 | 12/2010 | Hargreaves et al. |
| 2011/0007029 A1 | 1/2011 | Ben-David |
| 2011/0193776 A1 | 8/2011 | Oda et al. |
| 2011/0219892 A1 | 9/2011 | Fukushima et al. |
| 2012/0146958 A1 | 6/2012 | Oda et al. |
| 2012/0154340 A1 * | 6/2012 | Vuppu ............... G06F 3/03545 345/179 |
| 2012/0194441 A1 | 8/2012 | Frey |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2012/0327041 A1 * | 12/2012 | Harley ............... G06F 3/044 345/179 |
| 2012/0331546 A1 * | 12/2012 | Falkenburg ............. G06F 3/044 726/16 |
| 2013/0032414 A1 | 2/2013 | Yilmaz et al. |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Lynch et al., "Electronic Devices With Convex Displays," U.S. Appl. No. 61/454,950, filed Mar. 21, 2011, 28 pages.

Myers et al., "Electronic Devices With Concave Displays," U.S. Appl. No. 61/454,936, filed Mar. 21, 2011, 23 pages.

Rothkopf et al., "Electronic Devices With Flexible Displays," U.S. Appl. No. 61/454,894, filed Mar. 21, 2011, 41 pages.

Song, Hyunyoung et al., "Grips and Gestures on a Multi-Touch Pen," *CHI 2011, Session: Flexible Grips & Gestures*, Vancouver, BC, Canada, May 2001.

Tan, Eng Chong et al., "Application of Capacitive Coupling to the Design of an Absolute-Coordinate Pointing Device," *IEEE Transactions on Instrumentation and Measurement*, vol. 54, No. 5, Oct. 2005.

German Office Action, dated Dec. 28, 2020, for German Application No. 10 2012 025 862.3, 11 pages. (with English machine translation).

* cited by examiner

MULTI-ELECTRODE ACTIVE STYLUS TIP

RELATED APPLICATION

This application claims the benefit, under 35 U.S.C. § 119(e), of U.S. Provisional Patent Application No. 61/553,114, filed 28 Oct. 2011, which is incorporated herein by reference.

TECHNICAL FIELD

This disclosure generally relates to touch-position sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
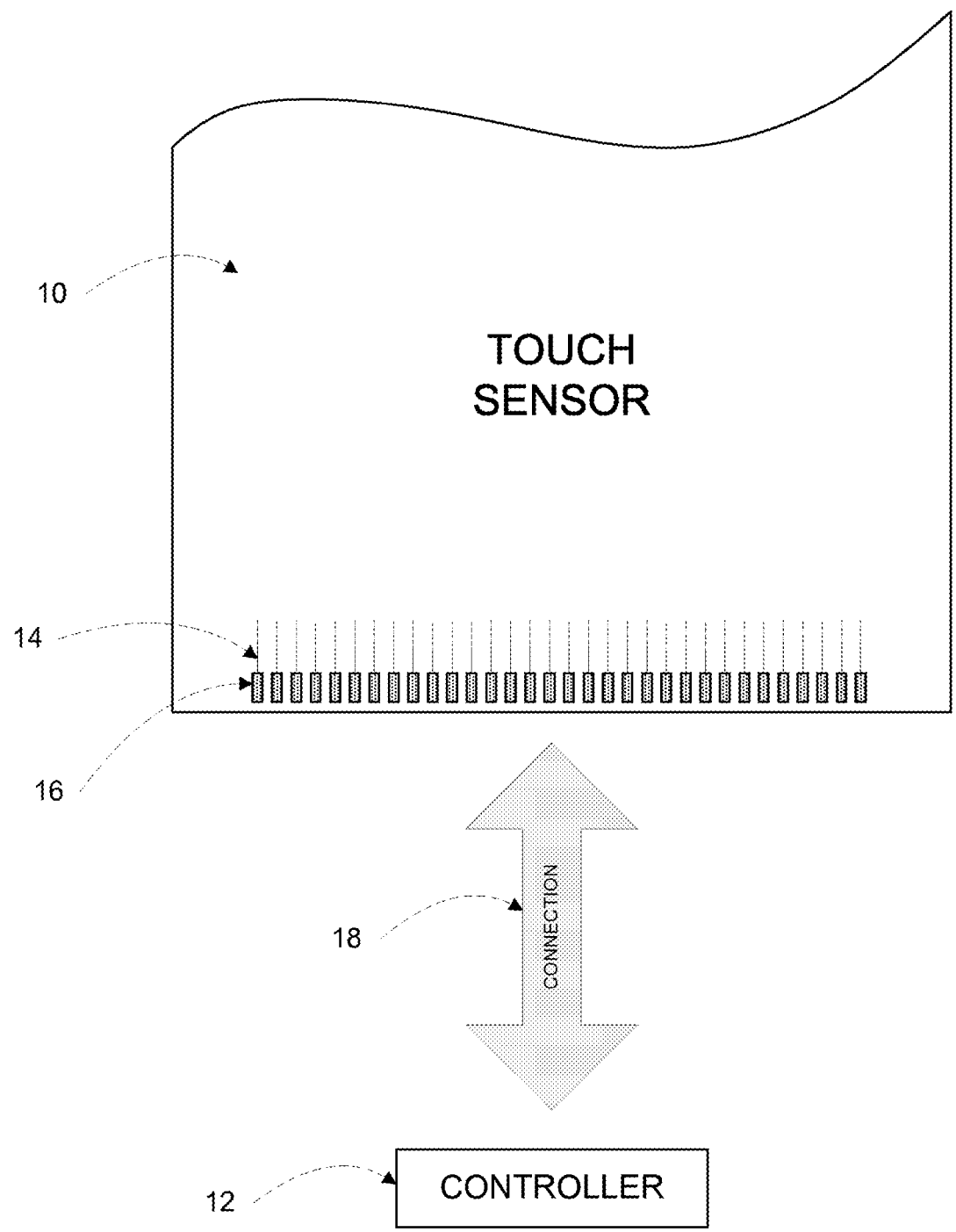
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more microfeatures of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection.

Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
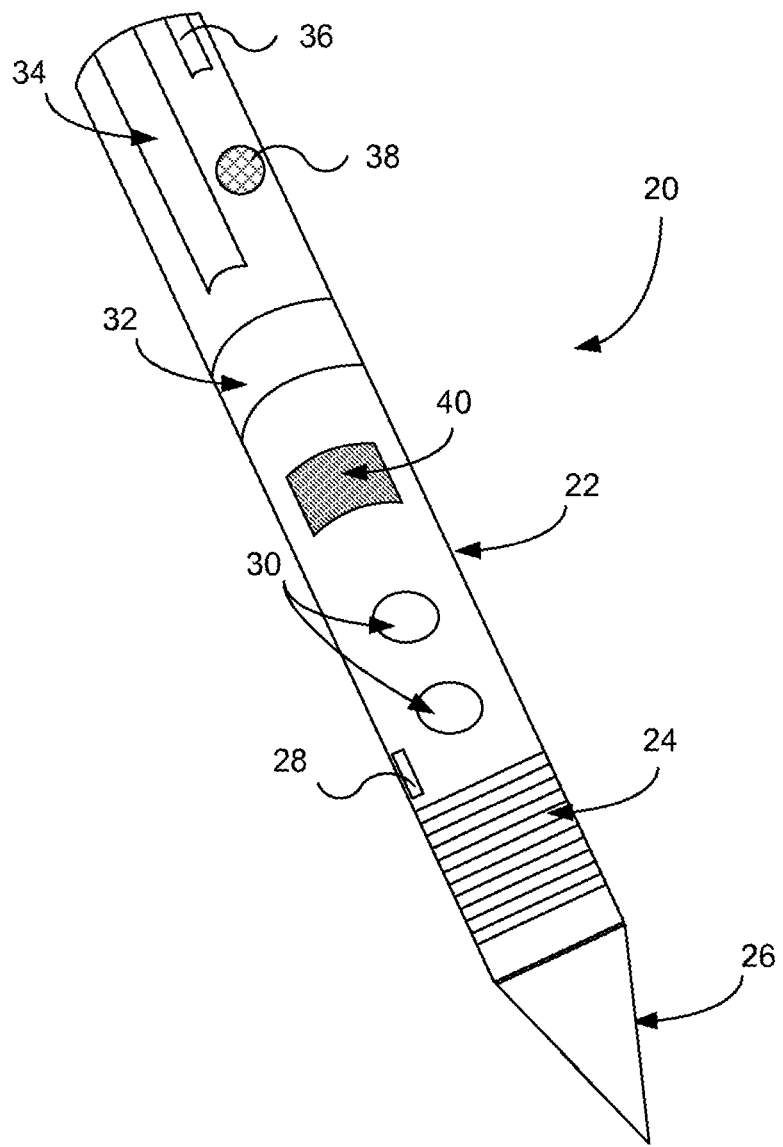
FIG. 2 illustrates an example active stylus exterior.

FIG. 2 illustrates an example exterior of an example active stylus 20. Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
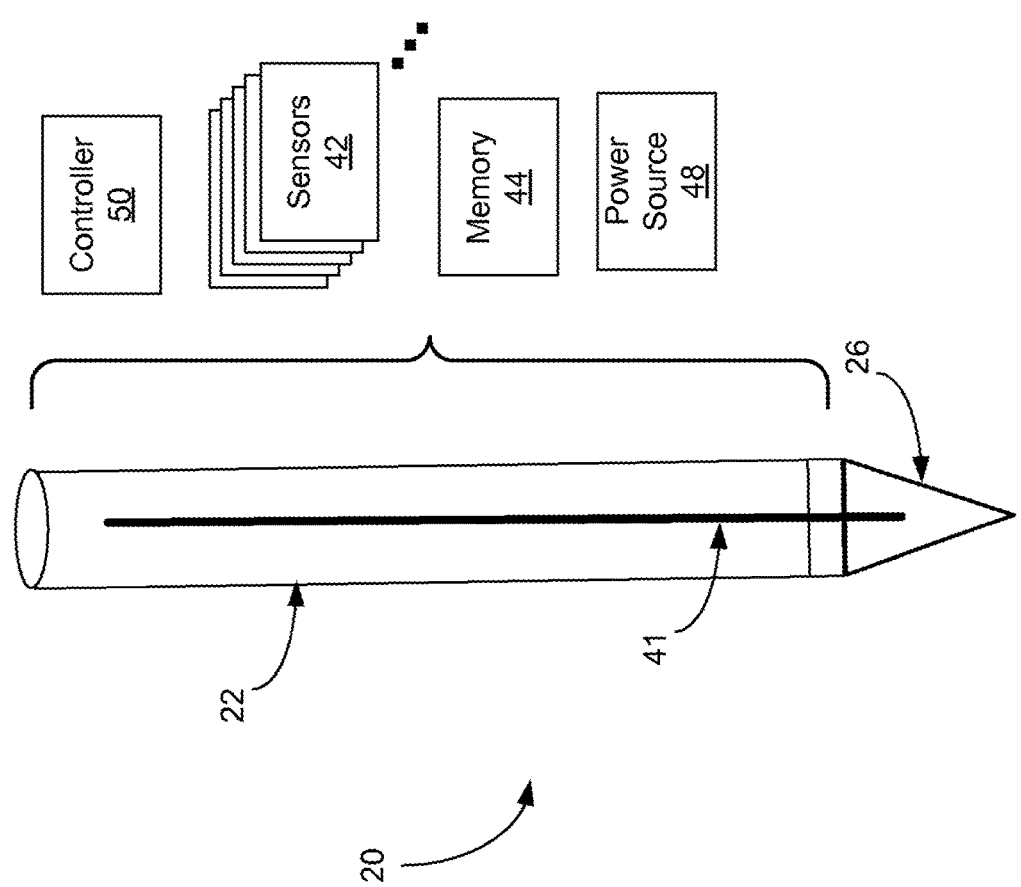
FIG. 3 illustrates an example active stylus interior.

FIG. 3 illustrates an example internal components of example active stylus 20. Active stylus 20 may include one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
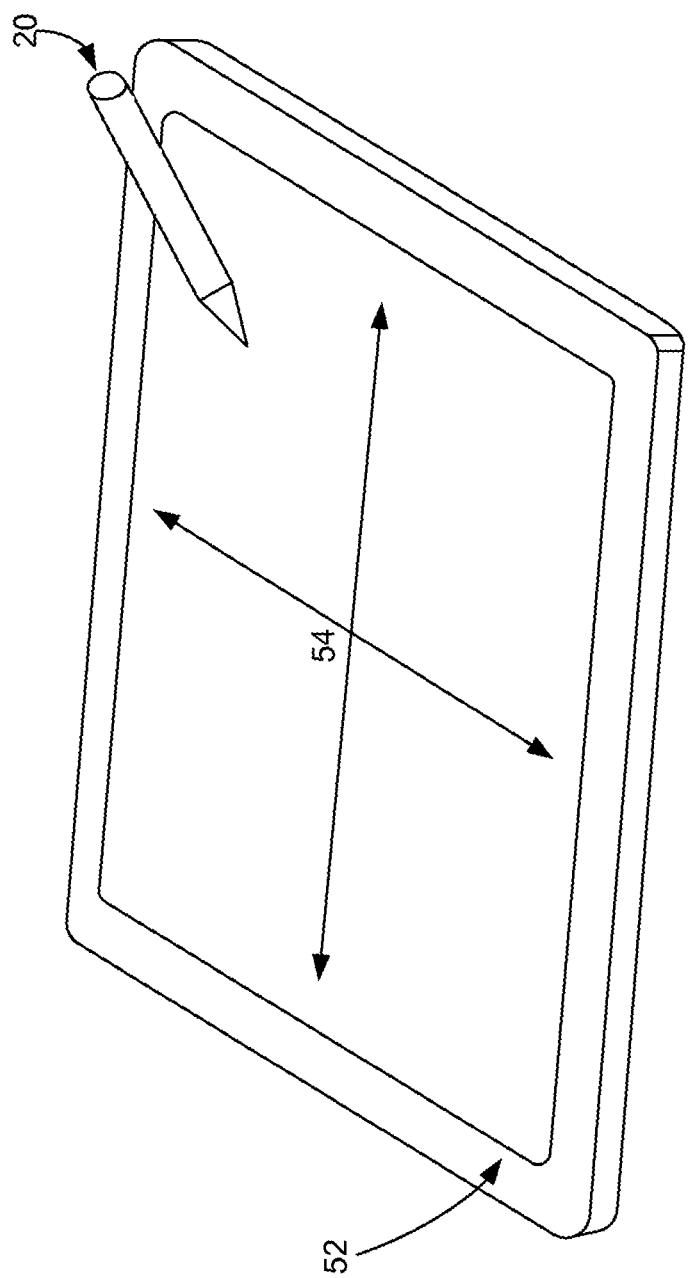
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5A:
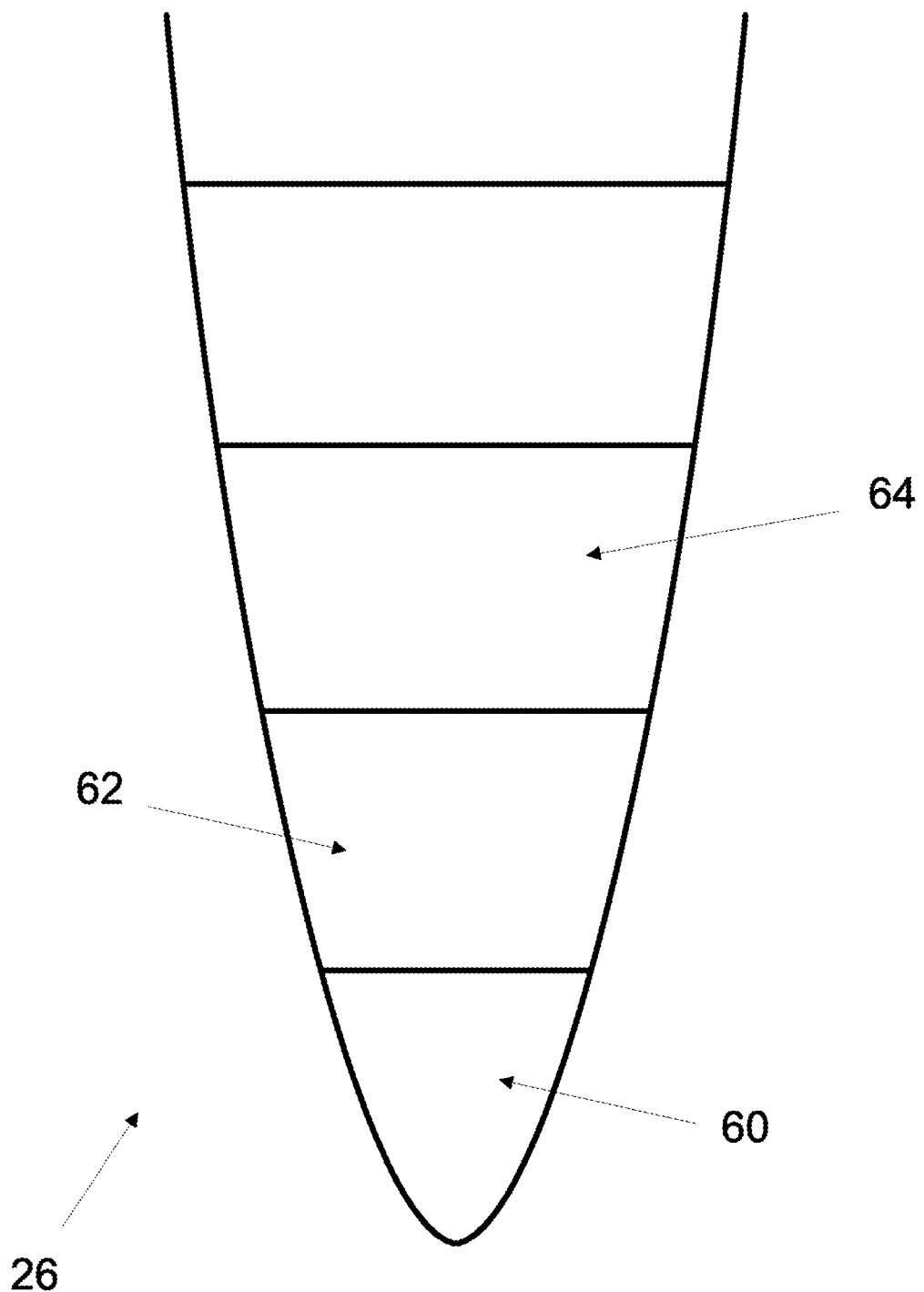
FIG. 5A illustrates an example multi-electrode active stylus tip.

FIG. 5A illustrates an example active stylus tip 26. Active stylus tip 26 may include one or more electrodes 60, 62, and 64 configured to communicate data between active stylus 20 and one or more devices or other active styluses. Active stylus tip 26 may include further components or functionality not illustrated in FIG. 5, 6, 7, or 8. As an example, active stylus tip 26 may include one or more mechanical switches operable to physically switch the connectivity of one or more electrodes in the tip. As another example, active stylus tip 26 may include logic, including, for example, a multiplexer. As yet another example, active stylus tip may include electric or electronic circuit elements, including, for example, an operational amplifier.

As an example and without limitation, an electrode in active stylus tip 26 may be a ground electrode, a guard electrode, a drive electrode, or a sense electrode. In particular embodiments, the electrodes in active stylus tip 26 may be formed from conductive material or resistive material. The electrodes in active stylus tip 26 may each be an area of conductive material forming a shape, such as for example a disc, square, rectangle, other suitable shapes, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable patterns. The electrodes in active stylus tip 26 may, in particular embodiments, be disposed on a surface of active stylus tip 26, or in a region in active stylus tip 26. In particular embodiments, the electrodes may be disposed on one or more substrates in active stylus tip 26. As an example, active stylus tip 26 may contain multiple substrates, and each substrate may have one electrode disposed on it. As another example, active stylus tip 26 may contain multiple substrates, and each substrate may have multiple electrodes disposed on it. The substrates may be arranged in any suitable fashion in active stylus tip 26, including having the substrates each be a layer (resting on other substrates or layers) on the surface of active stylus 26. As another example, an electrode may be disposed in (e.g., embedded within) a substrate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of the active stylus tip 26 may constitute in whole or in part one or more macro-features of the active stylus tip 26. One or more characteristics of the implementation of those shapes (such as, for example, the conductive materials, fills, or patterns within the shapes) may constitute in whole or in part one or more micro-features of the active stylus tip 26. One or more macro-features of an active stylus tip 26 may determine one or more characteristics of its functionality, and one or more micro-features of the active stylus tip 26 may determine one or more optical features of the active stylus tip 26, such as transmittance, refraction, or reflection.

Figure 5B:
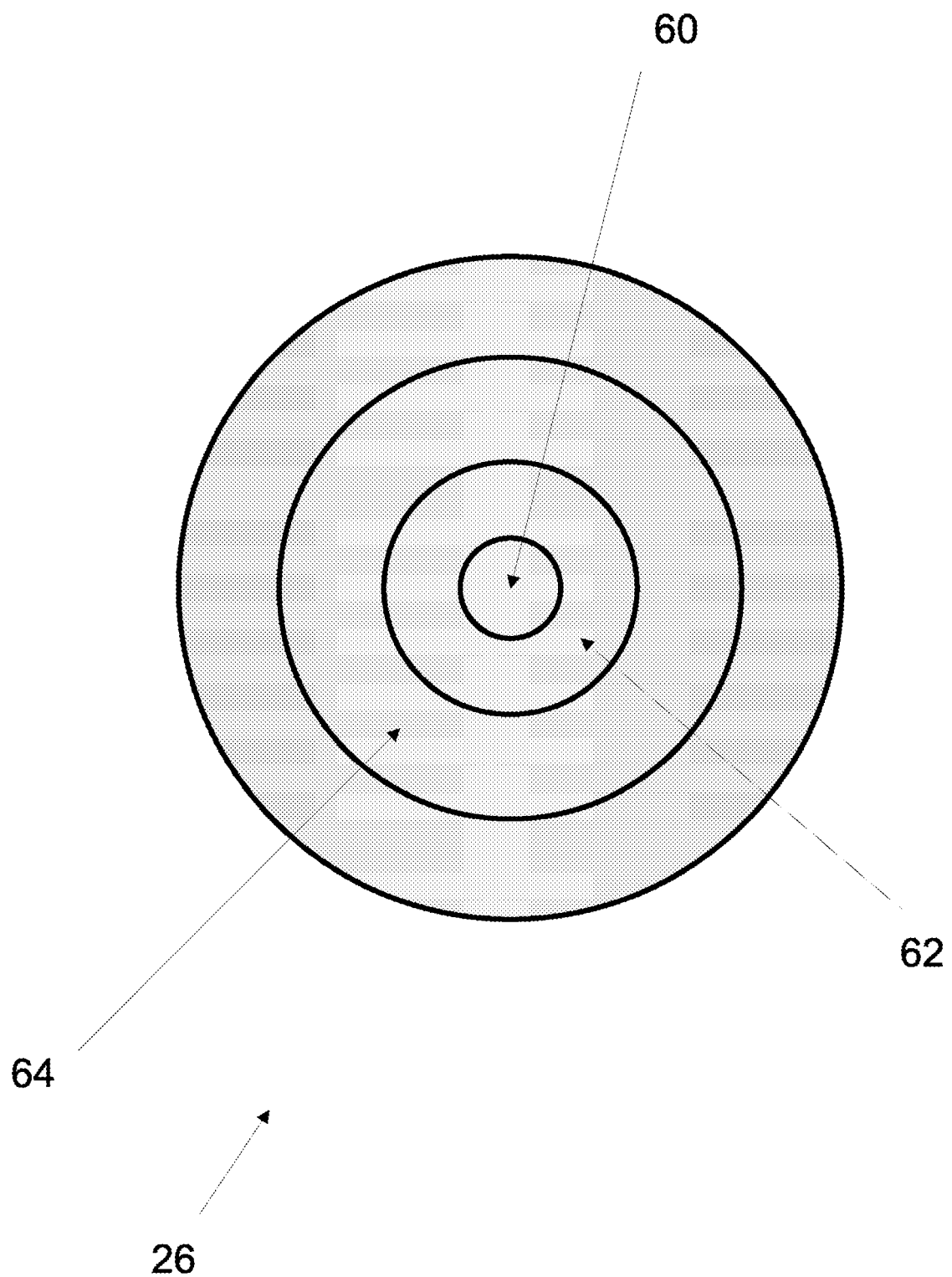
FIG. 5B illustrates a head-on view of an example multi-electrode active-stylus tip.

In the example embodiment illustrated in FIG. 5A, active stylus tip 26 contains one or more electrodes, including electrodes 60, 62, and 64. The electrodes are disposed on a surface of active stylus tip 26 and are stacked upon one another on the surface, such that the area comprising electrode 62 sits adjacent to and above electrode 60, and the area comprising electrode 64 sits adjacent to and above electrode 62 on the active stylus tip 26. The electrodes in this embodiment each comprise a horizontal segment of the surface active stylus tip 26. FIG. 5B illustrates an alternate view of the example embodiment of active stylus tip 26 illustrated in FIG. 5A. In FIG. 5B, active stylus tip 26 is viewed head-on, such that each horizontal segment of the tip in FIG. 5A corresponds to a circular or ring-like region in FIG. 5B.

Figure 6A:
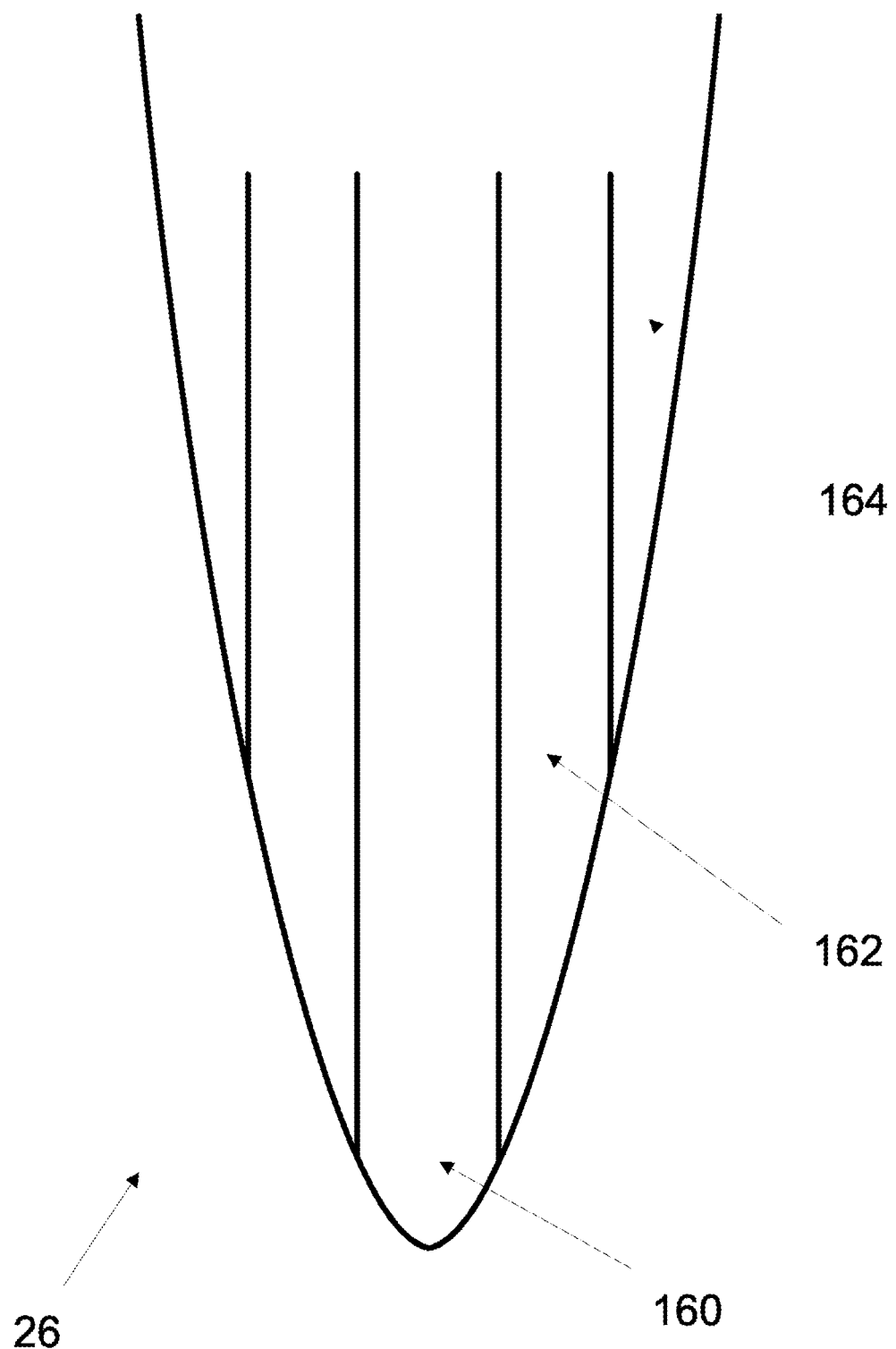
FIG. 6A illustrates an example multi-electrode active stylus tip.
Figure 6B:
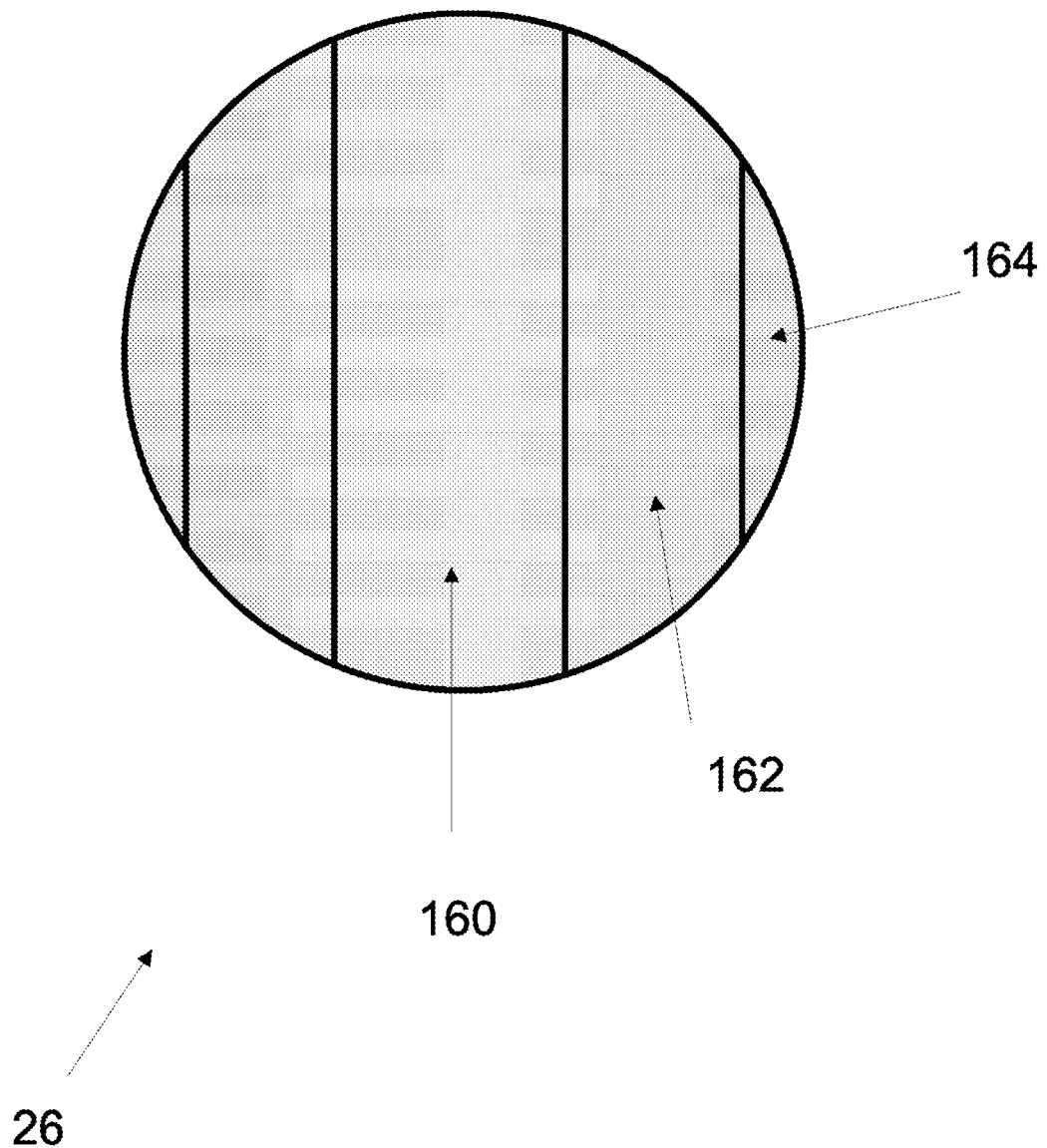
FIG. 6B illustrates a head-on view of an example multi-electrode active-stylus tip.
Figure 6C:
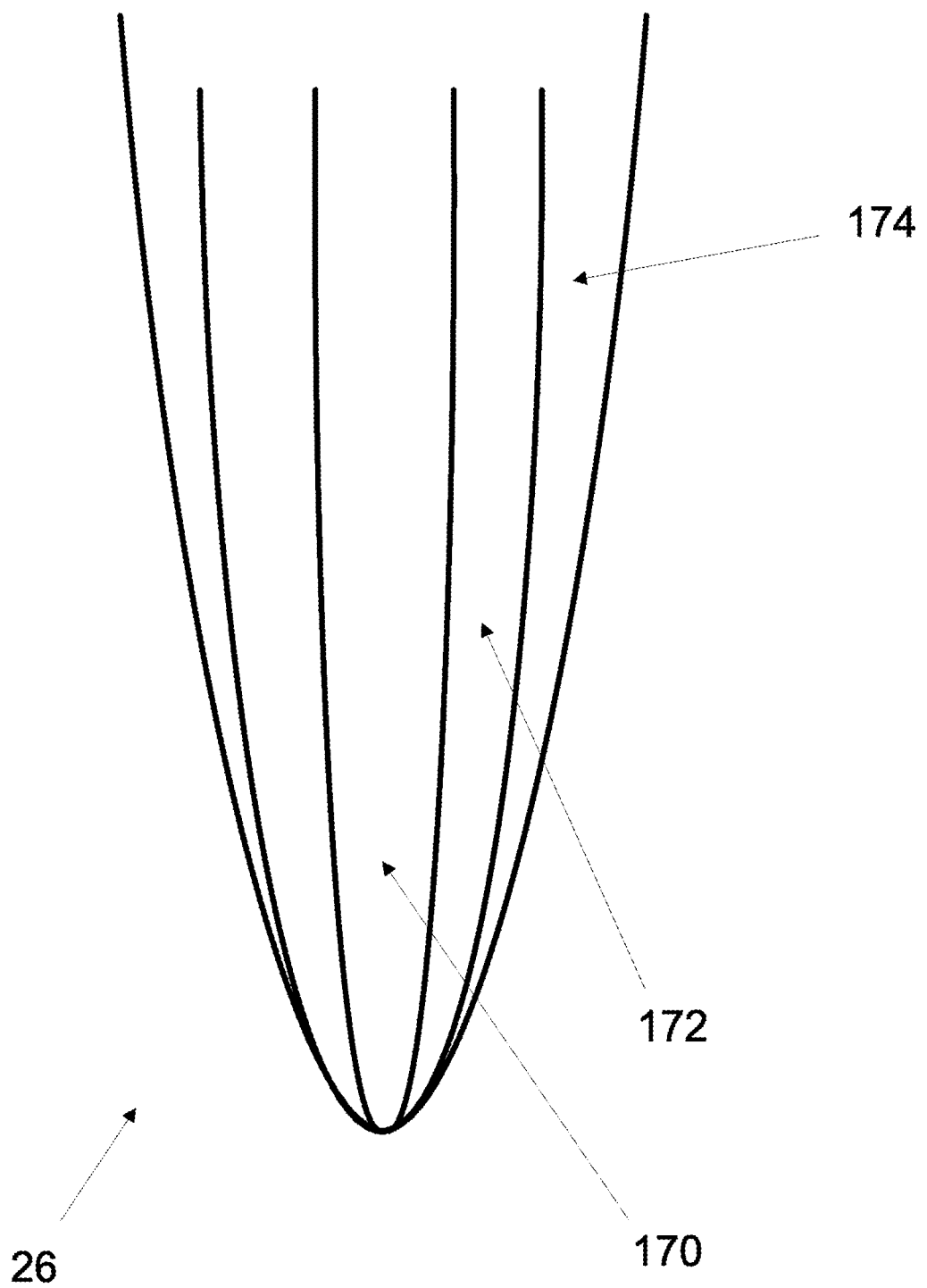
FIG. 6C illustrates an example multi-electrode active stylus tip.
Figure 6D:
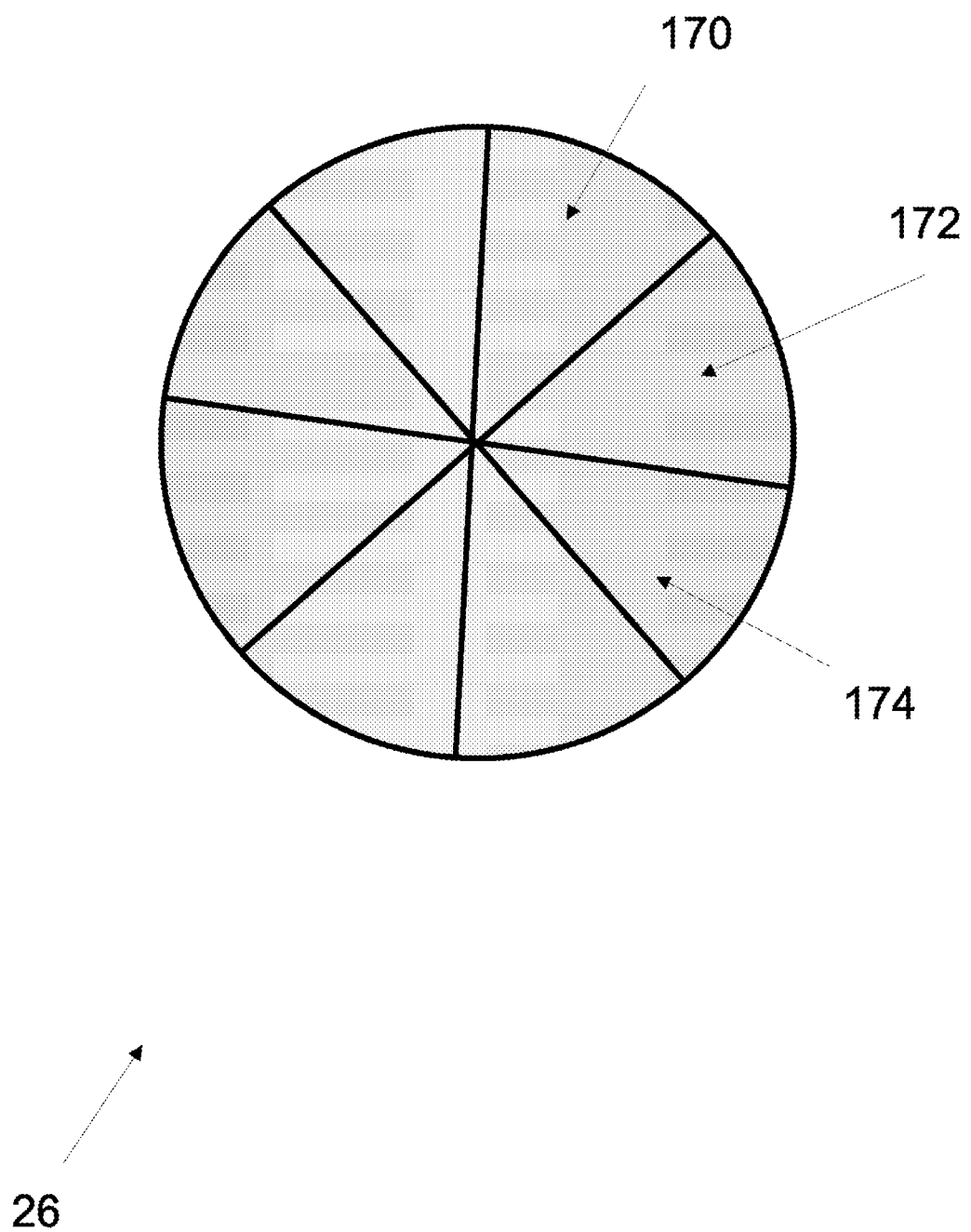
FIG. 6D illustrates a head-on view of an example multi-electrode active-stylus tip.

FIG. 6A illustrates another example embodiment of the electrodes in active stylus tip 26. In this example, active stylus tip 26 contains one or more electrodes, including electrodes 160, 162, and 164. In particular embodiments, including the one illustrated in FIG. 6A, one or more of the electrodes in active stylus tip 26 extend along a portion of the length of active stylus tip 26 but do not extend the entire length of active stylus tip 26. In other embodiments, the electrodes in active stylus tip 26 each extend the length of active stylus tip 26. The electrodes in the embodiment illustrated in FIG. 6A each comprise a vertical segment of active stylus tip 26. FIG. 6B illustrates an alternate view of the example embodiment of active stylus tip 26 illustrated in FIG. 6A. In FIG. 6B, active stylus tip 26 is viewed head-on, such that each vertical segment of the tip in FIG. 6A corresponds to a strip-like region in FIG. 6B. FIG. 6C illustrates yet another embodiment, in which the electrodes (including electrodes 170, 172, and 174) comprise vertical segments of active stylus tip 26 that extend radially outward from the center shaft 41 in active stylus tip 26. FIG. 6D illustrates an alternate view of the example embodiment of active stylus tip 26 illustrated in FIG. 6C. In FIG. 6D, active stylus tip 26 is viewed head-on, such that each vertical segment of the tip in FIG. 6C corresponds to a radial segment in FIG. 6D.

Figure 7A:
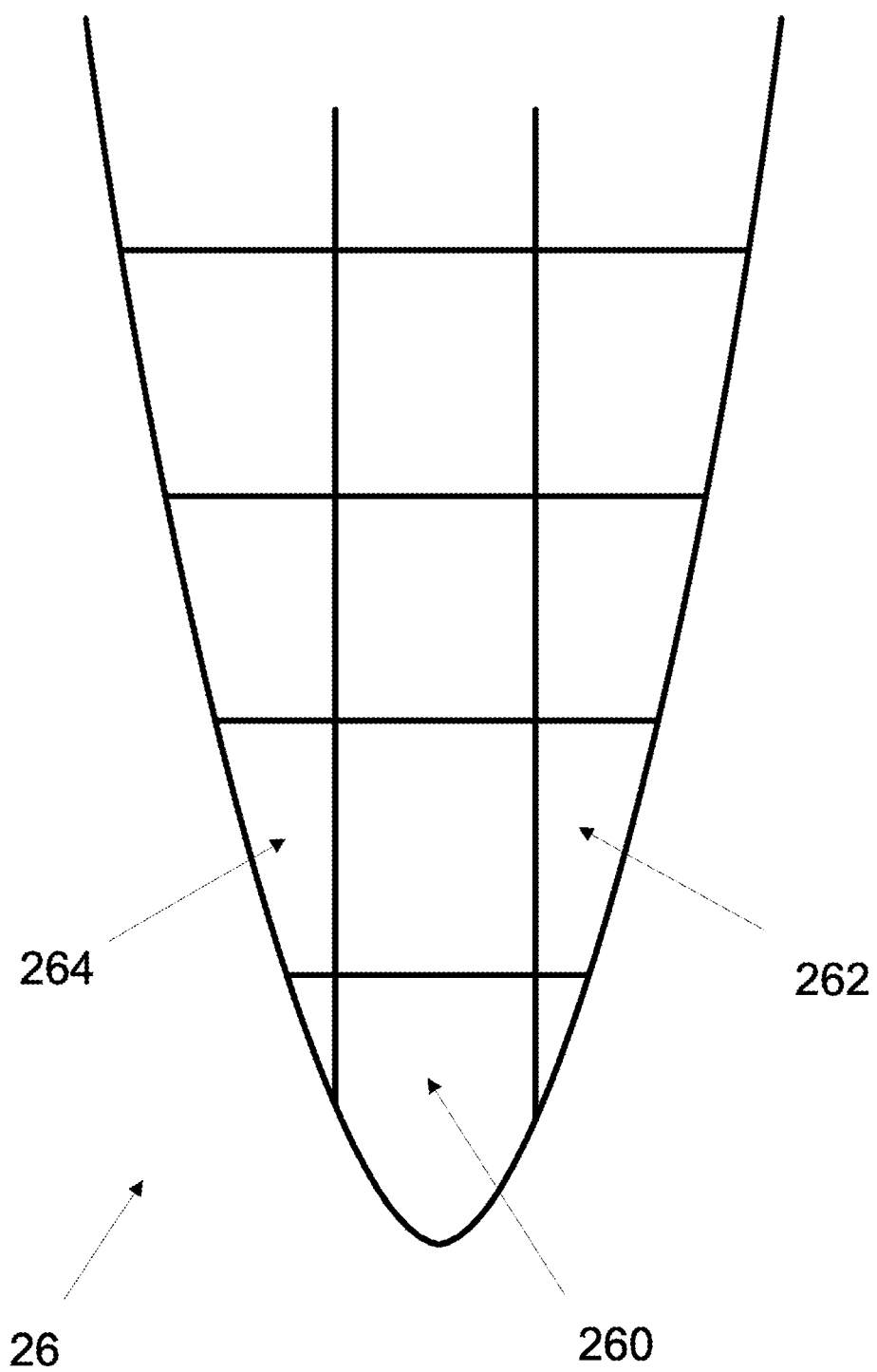
FIG. 7A illustrates an example multi-electrode active stylus tip.
Figure 7B:
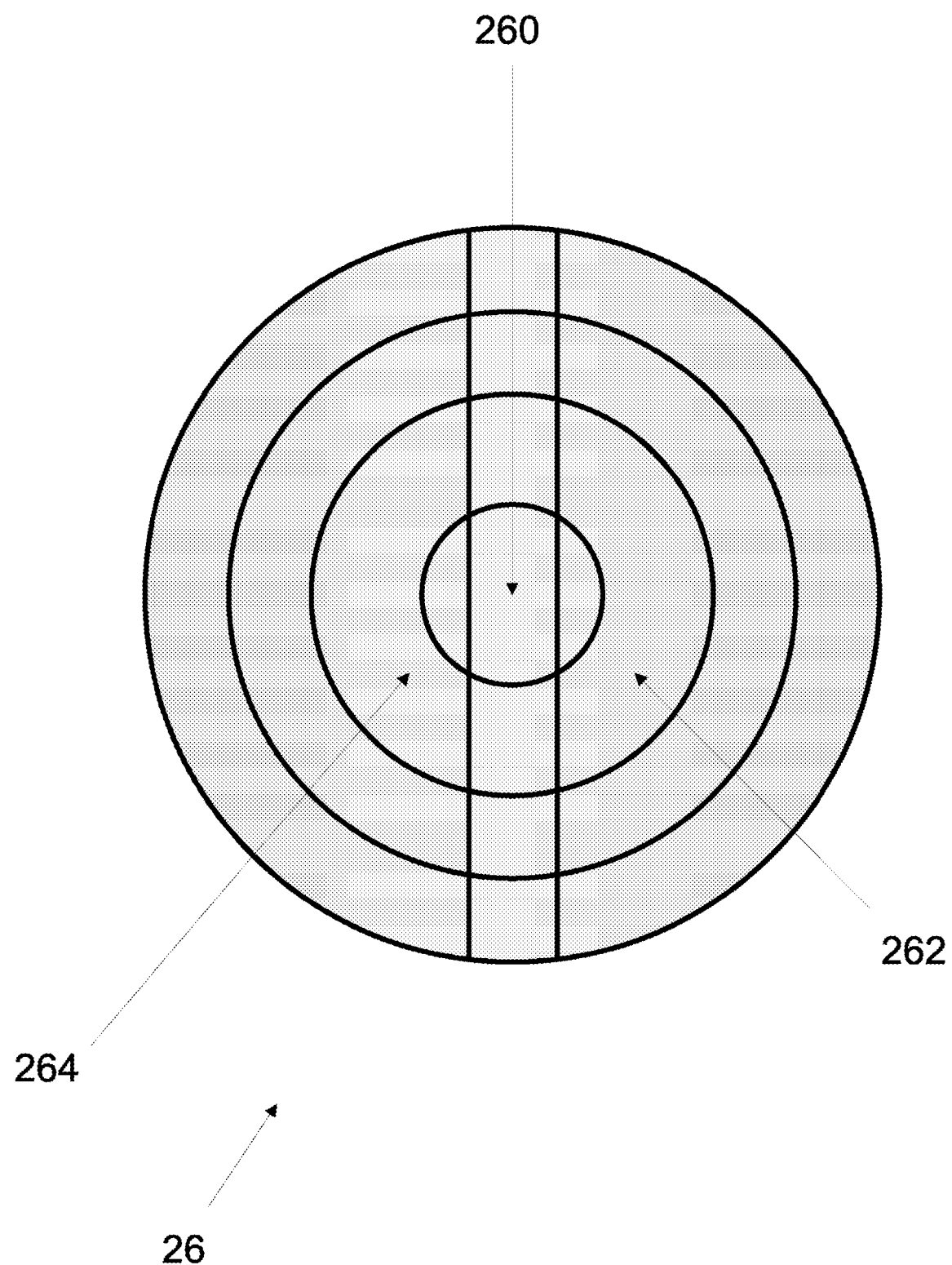
FIG. 7B illustrates a head-on view of an example multi-electrode active-stylus tip.
Figure 7C:
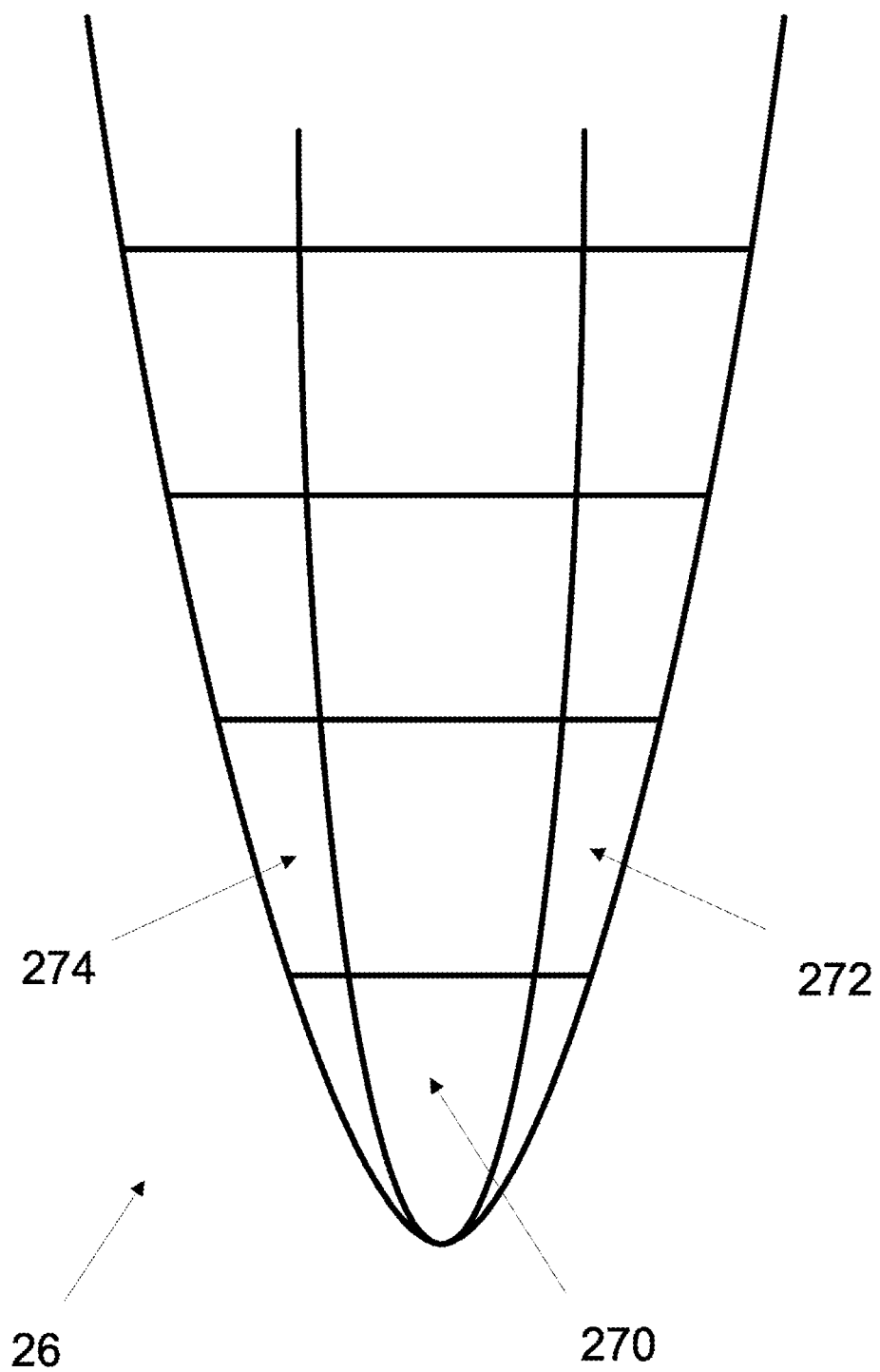
FIG. 7C illustrates an example multi-electrode active stylus tip.
Figure 7D:
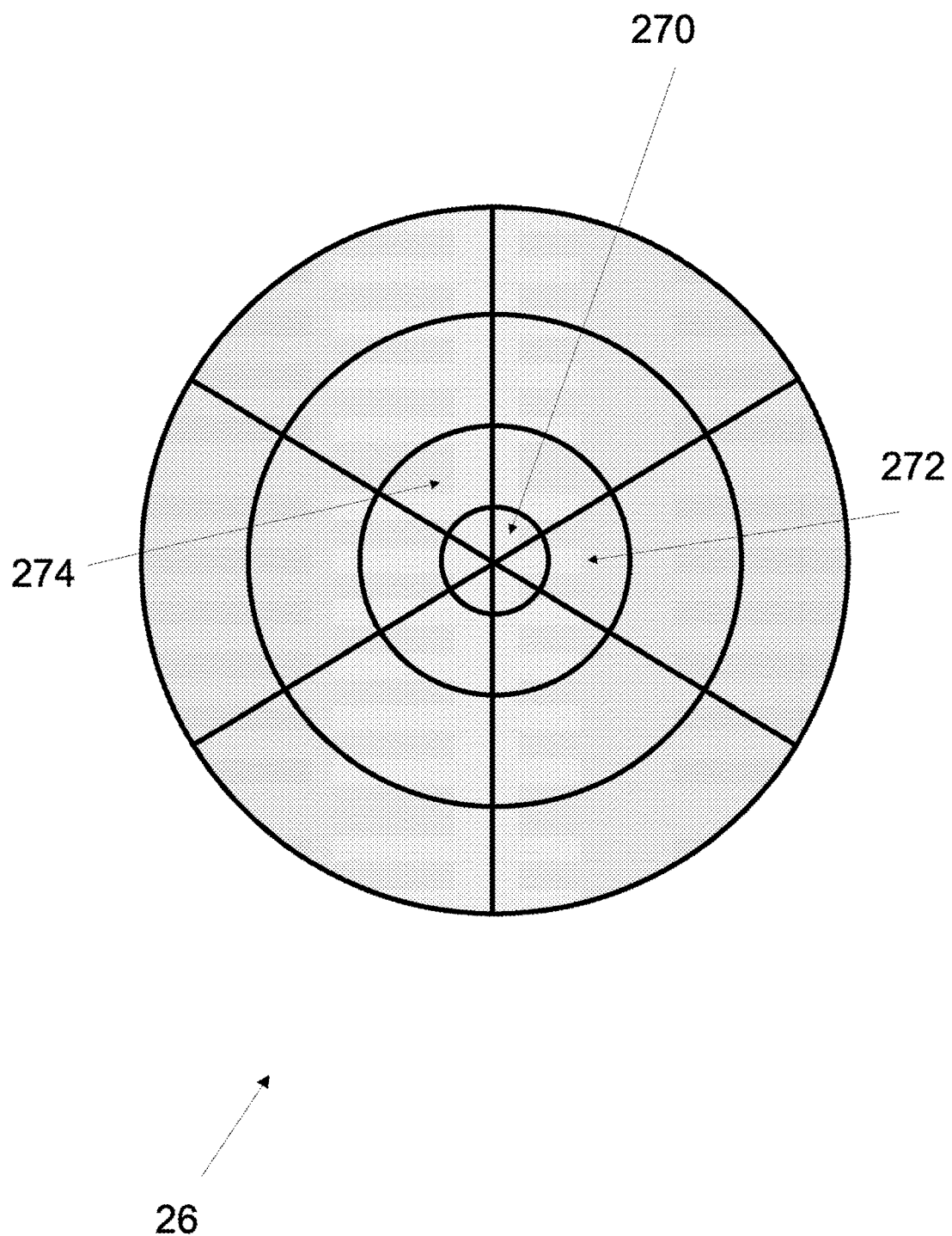
FIG. 7D illustrates a head-on view of an example multi-electrode active-stylus tip.

FIG. 7A illustrates yet another example embodiment of the electrodes in active stylus tip 26. In this example, active stylus tip 26 contains one or more electrodes, including electrodes 260, 262, and 264. The embodiment shown in FIG. 7A shows a grid of individual electrodes in active stylus tip 26. The grid is formed from dividing active stylus tip 26 into both horizontal and vertical segments. As such, each electrode, including electrodes 260, 262, and 264, comprises a vertically and horizontally bounded area within active stylus 26. FIG. 7B illustrates an alternate view of the example embodiment of active stylus tip 26 illustrated in FIG. 7A. In FIG. 7B, active stylus tip 26 is viewed head-on, such that each horizontal segment of the tip in FIG. 7A corresponds to a circular or ring-like region in FIG. 7B, and each vertical segment of the tip in FIG. 7A corresponds to a strip-like region in FIG. 7B. FIG. 7C illustrates yet another embodiment in which the electrodes (including electrodes 270, 272, and 274) are arranged in a grid formation. The grid in FIG. 7C is formed from dividing active stylus tip 26 into both horizontal and vertical segments, with each vertical segment extending radially outward from the center shaft 41 in active stylus tip 26. FIG. 7D illustrates an alternate view of the example embodiment of active stylus tip 26 illustrated in FIG. 7C. In FIG. 7D, active stylus tip 26 is viewed head-on, such that each electrode in the grid formation of FIG. 7C corresponds to a portion of a radial segment in FIG. 7D. In particular embodiments, one or more electrodes within the active stylus tip 26 may be surrounded by other electrodes within the active stylus tip 26.

Figure 8A:
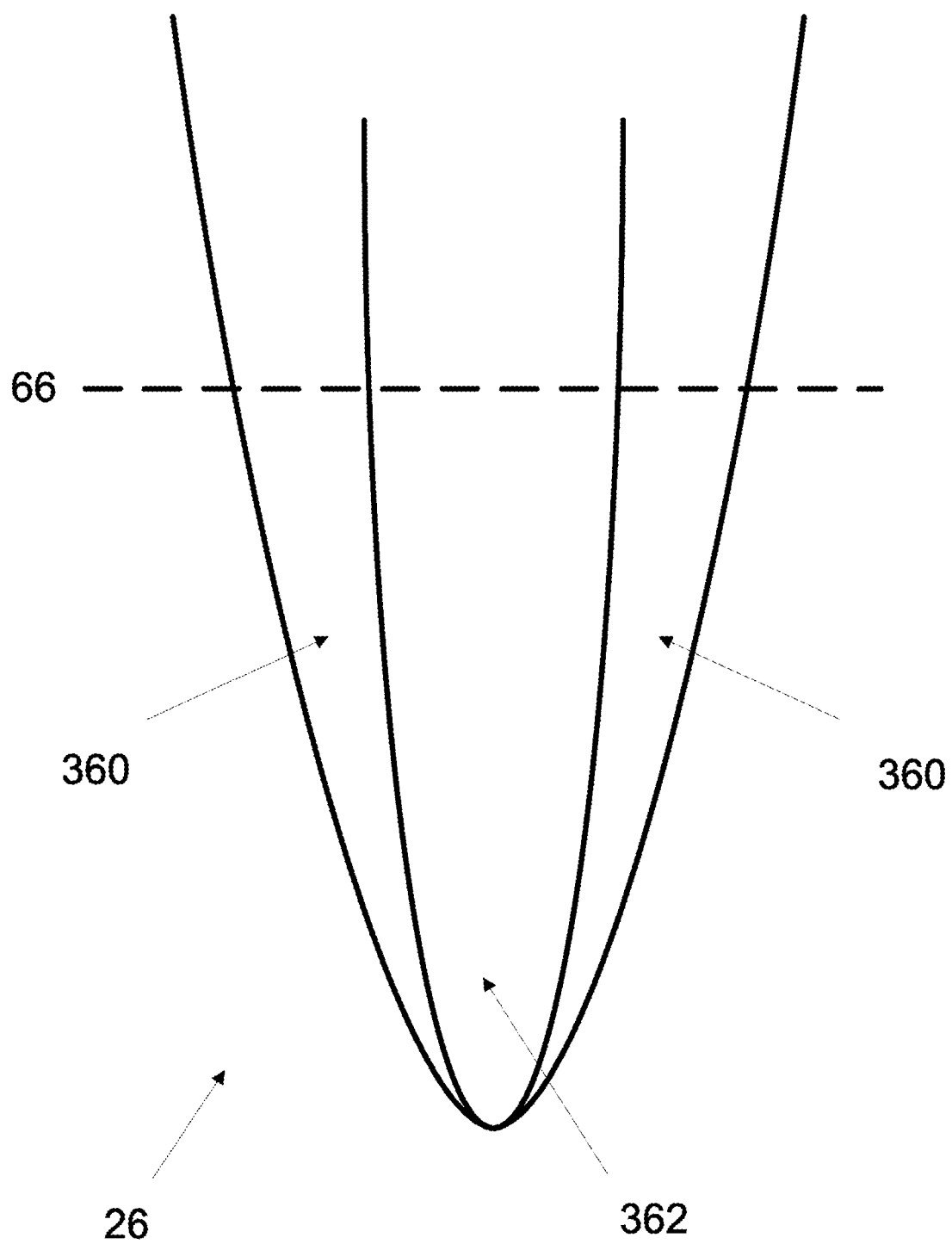
FIG. 8A illustrates an example multi-electrode active stylus tip.
Figure 8B:
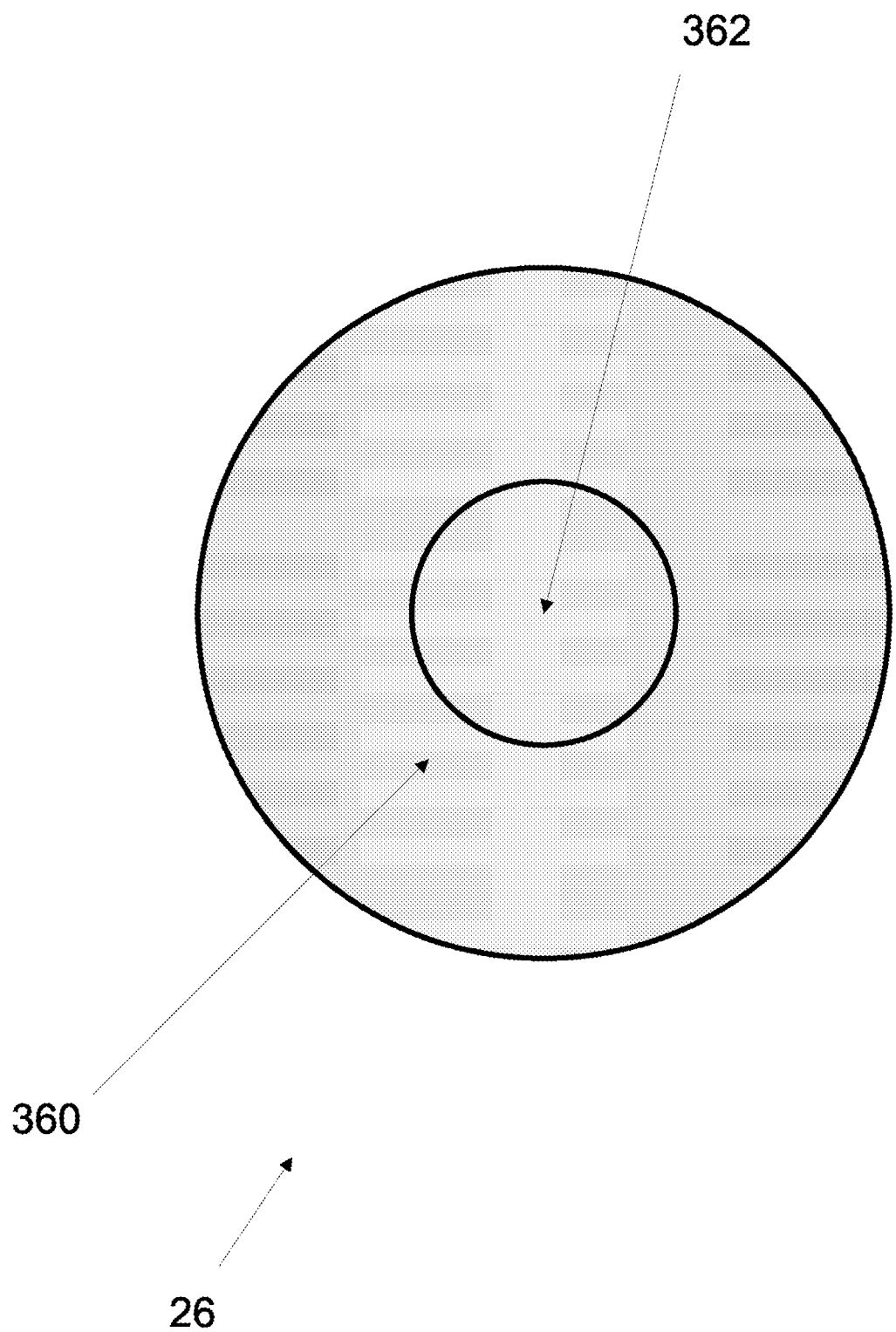
FIG. 8B illustrates an example multi-electrode active stylus tip.

FIGS. 8A and 8B illustrate yet another example embodiment of the electrodes in active stylus tip 26. In this example, active stylus tip contains one or more electrodes, including electrodes 360 and 362. Electrode 362 is surrounded by electrode 360. In the embodiment illustrated in FIGS. 8A and 8B, electrodes 362 and 360 comprise areas approximating a cylinder and a concentric cylindrical ring within active stylus tip 26. If active stylus tip 26 is cut along imaginary plane 66, the cross section of active stylus tip 26 would appear as illustrated in FIG. 8B, approximating a circle and a concentric ring.

Although particular example embodiments of active stylus tip 26 have been described, the multiple electrodes of active stylus tip 26 may be arranged in any configuration or form any shape that is desirable for the operation of active stylus 20. As an example, the electrodes in the active stylus tip 26 may be arranged to create a unique identifying signature for the active stylus 20. In particular embodiments, the active stylus tip 26 may have a nib region, and the electrodes in this nib region may be arranged to achieve a desired result, such as the capability to sense differences in pressure on the nib. As an example, the electrodes in the nib region may be arranged in a staggered pattern to detect variations in pressure. Additionally, in particular embodiments, active stylus tip 26 may be an interchangeable tip.

The multiple electrodes of active stylus tip 26 may each be able to receive signals from or send signals to other components of active stylus 20, a user, or device 52, without limitation. In particular embodiments, including those illustrated in FIGS. 5, 6, 7, and 8, the electrodes of active stylus tip 26 may each receive and send signals via center shaft 41. As an example, the electrodes in active stylus tip 26 may each receive signals from controller 50 via center shaft 41. In particular embodiments, a drive unit in controller 50 may supply signals to each of the electrodes in active stylus tip 26 via center shaft 41. The multiple electrodes of active stylus tip 26 may also each send signals to controller 50 via center shaft 41. As an example, the electrodes in active stylus tip 26 may each send signals to a sense unit in controller 50 via center shaft 41. In other embodiments, a processor in controller 50 may control the operation of the electrodes in active stylus tip 26, either via drive or sense units or directly. In particular embodiments, the multiple electrodes of active stylus tip 26 may each be able to receive signals from or send signals to logic (e.g. multiplexer), mechanical switches, electrical or electronic circuits or circuit elements (including, for example, operational amplifiers)

Each of the multiple electrodes in the active stylus tip 26 may be, by way of example and without limitation, a drive electrode, a sense electrode, a guard electrode, or a ground electrode.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A device comprising:
a stylus tip of a stylus operable to communicate wirelessly with another device through a touch sensor of the other device, the stylus tip comprising one or more surface areas;
one or more substrates disposed along one or more of the surface areas of the stylus tip;
a plurality of electrodes disposed on or in one or more of the substrates in a grid formation such that at least two vertical electrodes are positioned relative to each other along a central vertical axis of the stylus tip and at least two horizontal electrodes are positioned relative to each other along a horizontal axis substantially perpendicular to the central vertical axis,
wherein the at least two vertical electrodes include a first electrode and a second electrode configured to transmit signals to the other device through the touch sensor and to receive signals transmitted by the other device through the touch sensor, and
wherein at least portions of the first electrode and the second electrode are disposed as two segments in a stack relative to one another along the central vertical axis of the stylus tip, and wherein the two segments are of the one or more substrates and correspond to the first electrode and the second electrode, respectively.

2. The device of claim 1, wherein the first electrode is disposed along the central vertical axis of the stylus tip, and wherein the second electrode is disposed as a ring surrounding the first electrode.

3. The device of claim 1, wherein each of the first electrode and the second electrode is disposed on or in a corresponding one of the two segments of the one or more substrates, and wherein each of the first electrode and the second electrode extends along at least a portion of the length of the corresponding segment along the central vertical axis of the stylus tip.

4. The device of claim 1, wherein the one or more substrates are segmented, and wherein each segment corresponds to an electrode.

5. The device of claim 1, further comprising one or more computer-readable non-transitory storage media embodying logic that is operable when executed to dynamically configure the first electrode and the second electrode.

6. The device of claim 1, further comprising mechanical means operable to dynamically configure the first electrode and the second electrode.

7. The device of claim 1, further comprising electrical or electronic means operable to dynamically configure the first electrode and the second electrode.

8. The device of claim 1, wherein each of the plurality of electrodes is operable to be dynamically configured as a drive electrode to transmit the signals or a sense electrode to receive the signals.

9. The device of claim 1, wherein each of the electrodes is operable to be dynamically configured as a ground electrode or a guard electrode.

10. The device of claim 1, wherein the stylus is synchronized to the device by receiving the signals transmitted by the other device.

11. The device of claim 10, wherein the stylus is synchronized to the device through a pre-determined bit sequence transmitted by the touch sensor of the other device.

12. A system comprising:
a device comprising a touch sensor; and
a stylus operable to communicate wirelessly with the device through the touch sensor of the device, the stylus comprising a stylus tip, the stylus tip comprising:
one or more surface areas;
one or more substrates disposed along one or more of the surface areas of the stylus tip;
a plurality of electrodes disposed on or in one or more of the substrates in a grid formation such that at least two vertical electrodes are positioned relative to each other along a central vertical axis of the stylus tip and at least two horizontal electrodes are positioned relative to each other along a horizontal axis substantially perpendicular to the central vertical axis,
wherein the at least two vertical electrodes include a first electrode and a second electrode configured to transmit signals to the other device through the touch sensor and to receive signals transmitted by the other device through the touch sensor, and
wherein at least portions of the first electrode and the second electrode are disposed as two segments in a stack relative to one another along the central vertical axis of the stylus tip, and wherein the two segments are of the one or more substrates and correspond to the first electrode and the second electrode, respectively.

13. The system of claim 12, wherein the first electrode is disposed along the central vertical axis of the stylus tip, and wherein the second electrode is disposed as a ring surrounding the first electrode.

14. The system of claim 12, wherein each of the first electrode and the second electrode is disposed on or in a corresponding one of the two segments of the one or more substrates, and wherein each of the first electrode and the second electrode extends along at least a portion of the length of the corresponding segment along the central vertical axis of the stylus tip.

15. The system of claim 12, wherein the one or more substrates are segmented, and wherein each segment corresponds to an electrode.

16. The system of claim 12, further comprising one or more computer-readable non-transitory storage media embodying logic that is operable when executed to dynamically configure the first electrode and the second electrode.

17. The system of claim 12, further comprising mechanical means operable to dynamically configure the first electrode and the second electrode.

18. The system of claim 12, further comprising electrical or electronic means operable to dynamically configure the first electrode and the second electrode.

19. The system of claim 12, wherein each of the plurality of electrodes is operable to be dynamically configured as a drive electrode to transmit the signals or a sense electrode to receive the signals.

20. A method executed between an active stylus and a device coupled to a touch sensor, the method comprising:
configuring a plurality of electrodes in a grid formation for a stylus tip such that at least two vertical electrodes are positioned relative to each other along a central vertical axis of the stylus tip and at least two horizontal electrodes are positioned relative to each other along a horizontal axis substantially perpendicular to the central vertical axis, the at least two vertical electrodes including a first electrode and a second electrode to communicate wirelessly with the device through the touch sensor of the device, wherein the first electrode and the second electrode are disposed on or in one or more substrates disposed along one or more surface areas of the stylus tip, wherein at least portions of the first electrode and the second electrode are disposed as two segments in a stack relative to one another along the central vertical axis of the stylus tip, and wherein the two segments are of the one or more substrates and correspond to the first electrode and the second electrode, respectively;
transmitting, from the first electrode and the second electrode, signals to the other device through the touch sensor; and
receiving, at the first electrode and the second electrode, signals transmitted by the other device through the touch sensor.

* * * * *